3,216,840
CELLULOSE ESTER ARTICLE HAVING REDUCED BLUSHING

Benjamin P. Rouse, Jr., and Henry F. Gober, Jr., Kingsport, Tenn., assignors to Eastman Kodak Company, Rochester, N.Y., a corporation of New Jersey
No Drawing. Filed Apr. 22, 1963, Ser. No. 274,772
2 Claims. (Cl. 106—177)

This application is a continuation-in-part of Rouse et al. U.S. patent application Serial No. 808,196, filed April 22, 1959, now abandoned.

This invention relates to articles of manufacture, and more particularly to molded, extruded and vacuum-formed articles of manufacture.

One object of our invnetion is to provide articles of manufacture having good physical properties. Another object of our invention is to provide vacuum-formed articles of manufacture which have good physical properties and reduced blushing tendencies. Other objects of our invention will appear herein.

These and other objects of our invention are accomplished by providing vacuum formed articles of manufacture comprising a cellulose ester and 1–40%, and preferably 5–25%, by weight, sucrose acetate isobutyrate. Vacuum formed articles of manufacture prepared in accordance with our invention exhibit superior surface hardness, tensile strength at fracture, low water absorpation and solvent loss, and reduced tendency to blush.

The following example demonstrates superior vacuum-formed articles prepared in accordance with our invention:

Example 100 parts by weight of cellulose acetate, 20 parts by weight dimethoxyethyl phthalate, 10 parts by weight triphenyl phosphate and 10 parts by weight sucrose acetate isobutyrate were mixed for approximately 20 minutes in a sigma blade mixer after which the composition blend was processed on a two-roll rubber mill and pelletized. The pelletized composition thus obtained was extruded into a sheet and then vacuum formed into an article. The article thus obtained showed a reduced tendency to blush over a similar composition which did not contain sucrose acetate isobutyrate.

The sucrose acetate isobutyrate which we employ in our invention is described in Touey et al. U.S. Patent 2,931,-802, issued April 5, 1960. Preferably, the sucrose acetate isobutyrate contains from one to six acetyl groups and from two to seven isobutyryl groups per sucrose unit.

The cellulose esters which we employ in the vacuum formed articles of manufacture of our invention include all of the typical cellulose esters including cellulose acetate, cellulose nitrate, cellulose butyrate, cellulose propionate, cellulose acetate butyrate and cellulose acetate propionate. The articles of our invention have, as mentioned heretofor, exceptionally good physical properties. Typical articles of manufacture included in our invention are shoe heels, toys and the like.

The composition blend of the vacuum formed articles of our invention may contain various addenda such as dyes, stabilizers, deodorants, fungicides and the like.

Vacuum-formed articles comprising cellulose ester and 24–75 parts, per 100 parts cellulose ester, of a plasticizer combination, in a 2:1:1 ratio of respectively, dimethoxyethyl phthalate, triphenyl phosphate and sucrose acetate isobutyrate, exhibit an unexpected reduction in the tendency of the articles thus obtained to blush.

The invention has been described in detail with particular reference to preferred embodiments thereof but it will be understood that variations and modifications can be effected within the spirit and scope of the invention as described hereinabove and as defined in the appended claims.

We claim:
1. An article characterized by having a tendency toward reduction in blushing formed from a cellulose ester composition consisting of
   (a) 100 parts by weight of a lower fatty acid ester of cellulose, and
   (b) 24–75 parts by weight of a plasticizer combination consisting of a mixture in 2:1:1 ratio of dimethoxyethyl phthalate, triphenyl phosphate, and sucrose acetate isobutyrate.

2. An article characterized by having a tendency toward reduction in blushing formed from a cellulose ester composition consisting of
   (a) 100 parts by weight of a lower fatty acid ester of cellulose,
   (b) 20 parts by weight of dimethoxyethyl phthalate,
   (c) 10 parts by weight of triphenyl phosphate, and
   (d) 10 parts by weight of sucrose acetate isobutyrate.

References Cited by the Examiner

UNITED STATES PATENTS

| | | | |
|---|---|---|---|
| 1,821,413 | 9/31 | Whitehouse | 264—90 |
| 2,412,611 | 12/46 | Gloor | 106—196 |
| 2,809,120 | 10/57 | Sloan et al. | 106—196 |
| 2,931,802 | 4/60 | Touey et al. | 260—234 |

ROBERT F. WHITE, *Primary Examiner.*

ALEXANDER H. BRODMERKEL, *Examiner.*